March 9, 1965 F. J. SOBOTKA ET AL 3,172,492
VEHICLE LOAD WEIGHING APPARATUS
Filed Oct. 15, 1962 2 Sheets-Sheet 1

INVENTORS
FRANK JOSEPH SOBOTKA
FRANK EDWARD RICHARDSON
BY
Fetherstonhaugh & Co.
ATTORNEYS March 9, 1965  F. J. SOBOTKA ET AL  3,172,492
VEHICLE LOAD WEIGHING APPARATUS
Filed Oct. 15, 1962  2 Sheets-Sheet 2
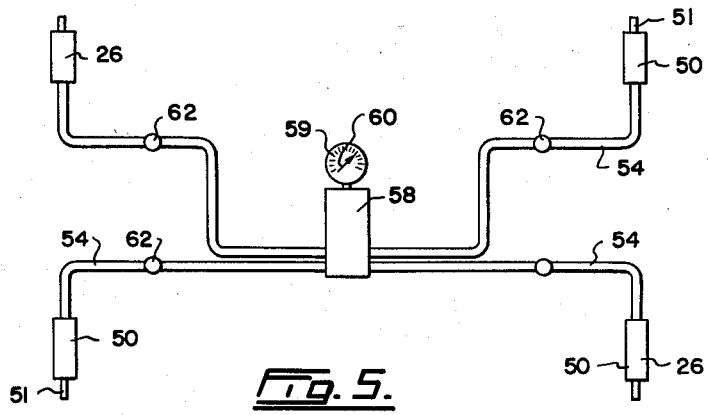
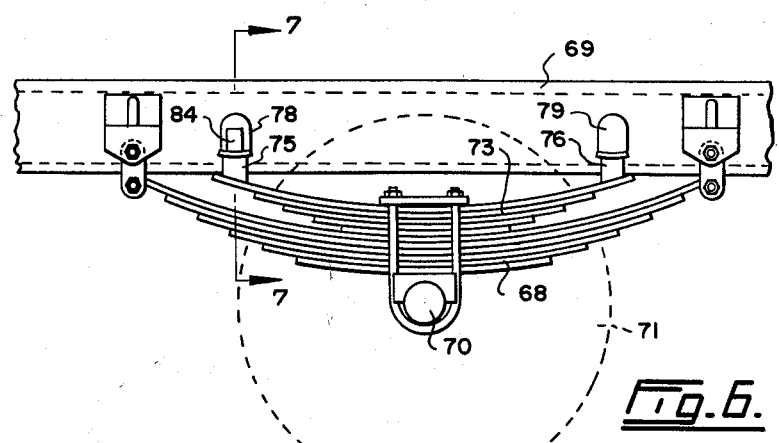
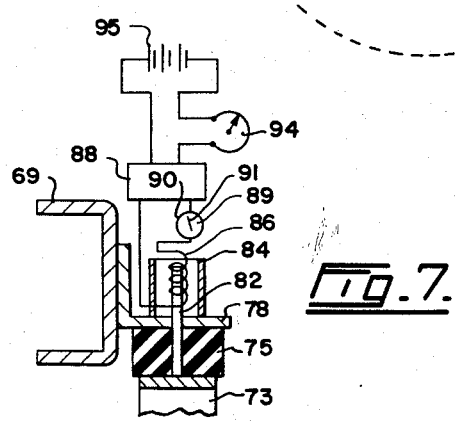
INVENTOR
FRANK JOSEPH SOBOTKA
FRANK EDWARD RICHARDSON
BY
Fetherstonhaugh & Co.
ATTORNEYS ical type operated by the operator or operators. In this

United States Patent Office 3,172,492
Patented Mar. 9, 1965

3,172,492
VEHICLE LOAD WEIGHING APPARATUS
Frank Joseph Sobotka, 6650 Napier Ave., North Burnaby, British Columbia, Canada, and Frank Edward Richardson, 1650 E. 3rd Ave., Vancouver, British Columbia, Canada
Filed Oct. 15, 1962, Ser. No. 253,011
(Filed under Rule 47(a) and 35 U.S.C. 116)
6 Claims. (Cl. 177—136)

This invention relates to apparatus to be mounted on vehicles, such as trucks, to indicate the weight of the load being carried by the vehicle.

An object of the present invention is the provision of load weight indicating apparatus for vehicles which is not affected by the amount of deflection of the vehicle springs, or by the condition of said springs due to fatigue or other causes.

Another object is the provision of load weight indicating apparatus which utilizes the movement of the supporting frame of the vehicle relative to its springs to indicate the load, and yet is not operated by the spring action during travel on rough roads.

A further object is the provision of load weight indicating apparatus which requires very little, if any, maintenance, and which may be installed on a vehicle with very little change in the ordinary suspension system of the vehicle.

The present indicating apparatus depends upon movement of the vehicle frame towards the vehicle springs, but does not depend upon axle movement or spring deflection for operation. There is in existence apparatus intended to serve the same purpose as the present weight indicating apparatus, but in the former, the movement of the vehicle frame towards the axle is utilized in the operation of the apparatus. As a result of this, any sagging of the springs due to fatigue affects the operation of the apparatus. This makes it necessary constantly to adjust the apparatus to the condition of the springs. Another disadvantage of the prior apparatus is that it is constantly operated by the axle during travel, and this action is exaggerated on rough roads. This constant operation causes the apparatus to wear out quickly, and it often interferes with proper operation.

It is becoming more imperative all the time to have reliable load weight indicating apparatus for trucks and other vehicles because of the tremendous amount of haulage that is constantly taking place on the highways, the very large loads that are being carried over the roads, and the stringent laws regarding the weight to be carried by the trucks in order to protect the highways. The overloading of a truck stresses its mechanical components beyond the recommendations of the manufacturer, and this results in mechanical failures, costly repairs and periods when the truck is not available for use. The present load weight indicating apparatus eliminates the possibility of a truck being overloaded without the knowledge of the operator. This protects the equipment and the highways, and eliminates trouble with the authorities regarding overloading.

Two examples of this invention are illustarted in the accompanying drawings, in which.

FIGURE 5 diagrammatically illustrates an indicator for this apparatus;

FIGURE 6 is a side elevation of an alternative form of weight indicating apparatus; and FIGURE 7 is a vertical section taken on the line 7—7 of FIGURE 6.

It is preferable to provide means at each of the four corners of a vehicle selectively to indicate the weight of the load at each corner for the total weight carried by the vehicle. The actual indicator may be of any desired type. For example, it may be operated hydraulically or electrically. The indicator must be calibrated to indicate zero when there is no load on the vehicle and from zero up beyond the greatest load the vehicle could carry. The indicator needs to be such that it can be set at the zero reading when desired. For the sake of clarity, the weight indicating apparatus for one corner or wheel only of a vehicle is illustrated and described herein.

Figure 1:
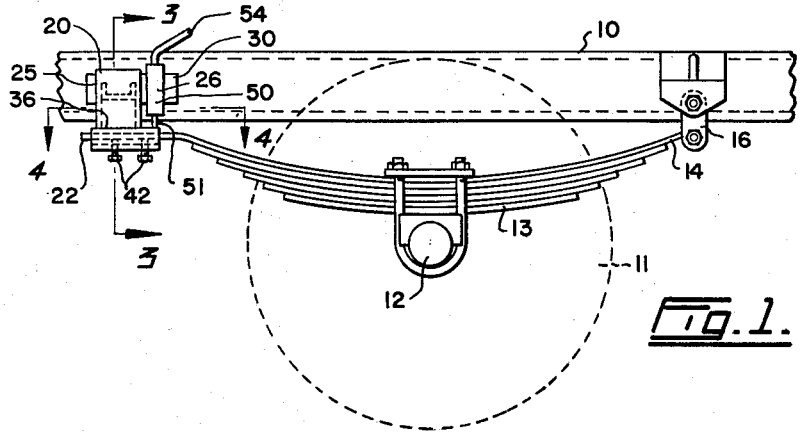
FIGURE 1 is a side elevation of a preferred form of the weight indicating apparatus mounted on a vehicle, a portion only of the latter being diagrammatically illustrated.
Figure 2:
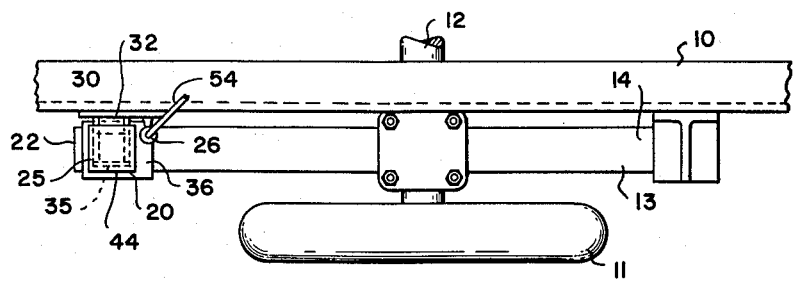
FIGURE 2 is a plan view of the apparatus shown in FIGURE 1.
Figure 4:
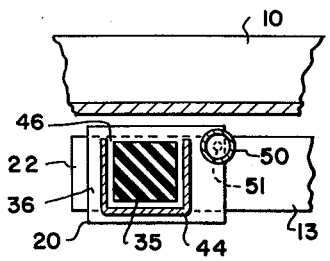
FIGURE 4 is an enlarged horizontal section taken substantially on the line 4—4 of FIGURE 1.
Figure 3:
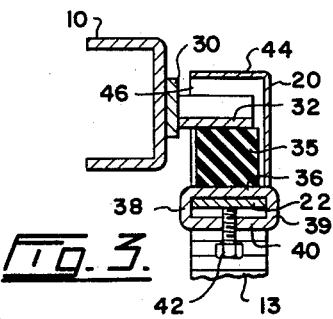
FIGURE 3 is an enlarged vertical section through the apparatus taken on the line 3—3 of FIGURE 1.

Referring to FIGURES 1 to 5 of the drawings, 10 represents a portion of the frame of a vehicle, such as a truck, near a wheel 11 of said vehicle. The wheel is mounted in the usual manner on an axle 12 which is secured to a spring 13 of the vehicle. The end 14 of this spring is secured to frame 10 in any desired manner, such as by means of a standard hanger or connector 16.

A preferred form of load weight indicating apparatus 20 is mounted on the vehicle at the opposite end 22 of spring 13. In this example, apparatus 20 is secured to the side of frame 10. The apparatus includes supporting means 25 and an operator 26.

Supporting means 25 is carried by spring 13, preferably near the end 22 thereof, and it supports the vehicle through frame 10. In the illustrated form of supporting means 25, a plate 30 is fixedly secured to the side of frame 10 in any desired manner, such as by means of welding or bolts, and an arm 32 is fixedly secured to and projects outwardly from said plate over but spaced above the end 22 of spring 13. The arm rests upon a supporting block 35 which is preferably formed of a suitable resilient material, such as rubber or plastic. Block 35 may rest directly on spring 22, but in this example, it rests on a base 36 which lies over and is secured to end 22 of the spring in any convenient manner. Base 36 includes downwardly extending side flanges 38 and 39 which overlap the sides of spring 13 and are connected at their lower ends by a cross brace 40. Suitable means is provided for removably securing base 36 to the spring, such as one or more set screws 42 threaded through brace 40 and tightened against the underside of spring end 22. A housing 44 is mounted on base 26 and encloses without touching arm 32 and block 35, see FIGURE 3. The side of housing 44 facing frame 10 is open, as indicated at 46 in order to permit arm 32 to move up and down relative to base 36 and the spring to which the latter is connected.

This relative movement between the arm and spring is utilized to operate an indicator. In this example, operator 26 is extensible, and has one part connected to frame 10 and another part engaging spring 22 or base 36 attached thereto. The illustrated operator consists of a hydraulic cylinder 50 fixedly secured to frame 10, and having a plunger or ram 51 movably projecting from the lower end thereof and engaging base 36. Movement of plunger 51 inwardly of the cylinder moves fluid out of the cylinder along a line 54, while movement of the plunger in the opposite direction draws fluid into the cylinder from said line.

FIGURE 5 diagrammatically illustrates one form of indicator actuated by an operator 26. As there is usually an apparatus 20 near each of the four corners of a vehicle, four operators are shown in this figure. An indicator generally designated by the numeral 58 of any desired construction is used. This indicator has a dial 59 calibrated for this purpose, and a pointer 60 which may be moved to new readings when desired. Pipe 54 has a control valve 62 therein between operator 26 and indicator 58. This indicator is installed at any desired point on the vehicle, but it is preferably in the driver's cab, as is each of the control valves 62.

After indicating apparatus 20 is installed on a vehicle at each of the corners thereof, with no load on the vehicle and with valves 62 open, pointer 60 is moved to the zero position. The frame of the vehicle is resting near each wheel through arm 32 on block 35 which, in turn, is supported by end 22 of spring 13. If a load is placed on the vehicle, frame 10 moves downwardly relative to spring 13, at which time arm 32 compresses block 35. Any deflection of the spring has nothing to do with the operation of this apparatus in view of the fact that operator 26 is beside supporting means 25 so that it is subjected to exactly the same conditions as the supporting means regardless of the condition of spring 13. The downward movement of the frame causes cylinder 50 to move downwardly relative to plunger 51 which is held up by the vehicle spring. This forces fluid along pipe 54 to operate indicator 58, pointer 60 thereof moving in accordance with the weight of the load applied to the vehicle. Any part of the load that is applied to another wheel of the vehicle causes apparatus 20 near said wheel to function in the same manner. As the total load is supported by the vehicle frame, and the latter is supported by the resilient blocks 35 of the four weight indicating devices, the total weight of the load is indicated on dial 59. If it is desired to know the portion of the weight carried by any one wheel, control valve 62 of the apparatus near the wheel is left open, while all the other control valves are closed. The reading on dial 59 will give the weight of the load carried by said wheel.

FIGURES 6 and 7 illustrate an alternative form of the invention. In order to show the different possibilities of the invention, this embodiment is shown in a different set-up from the embodiment described above. The spring 68 is connected to the frame 69 of a vehicle in the usual manner, said spring being attached to an axle 70 of a wheel 71. An overload spring 73 is mounted on spring 68, and suitable supporting means is provided at each end of the overload spring. For example, resilient blocks 75 and 76 are carried by the ends of the overload spring, while brackets 78 and 79 secured to and projecting outwardly from frame 69 rest upon blocks 75 and 76, respectively. An iron rod 82 slidably extends through block 75 and bracket 79, and extends into a casing 84 carried by said bracket.

Casing 84 and rod 82 constitute an operator for an indicator which is diagrammatically illustrated in FIGURE 7.

Rod 82 extends into a coil 86 within casing 84, said coil being connected in series with and forming part of the resonant circuit of an oscillator 88. An indicator 89 preferably in the form of a milliammeter having a dial 90 and a pointer 91 is connected in series with coil 86 and oscillator 88. A power input control switch 94 is provided in a circuit in series with oscillator 88 and a suitable battery 95. With this arrangement, any movement of the vehicle frame 10 relative to the vehicle springs produces a corresponding movement of rod 82 so that the latter moves upwardly or downwardly within the coil 86. Movement of rod 82 within coil 86 varies the inductance of the latter thereby to vary the resonant condition of oscillator 88 and consequently the current flowing through coil 86. These changes in the current flowing through coil 86, which are proportional to the movement of frame 10 relative to the springs and this proportional to the applied load, are indicated by indicator 89 and provide an accurate indication of the load applied to the associated wheel of the vehicle.

Pointer 91 of indicator 89 is set at zero when there is no load on the vehicle frame 69. When a load is placed on the vehicle, bracket 78 moves downwardly on resilient block 75 towards overload spring 73. Housing 84 moves downwardly with the bracket so that in effect rod 82 moves upwardly in coil 86. Indicator 89 shows the weight of the load on the vehicle.

There may be a different indicator 89 for the weight indicating apparatus near each wheel of the vehicle, or there may be only one such indicator, in which case suitable switching means for selectively connecting the coil 86 of each device, or the coils 86 of the devices associated with a particular axle of the vehicle, or the coils 86 of all of the devices, in series with the oscillator 88 and indicator 89. In this manner, the load on each wheel, on each axle and the total load on the vehicle may be readily determined.

Both of the described embodiments of this invention require very little change in the actual suspension system of the vehicle to which it is attached, each form of the apparatus is very simple, requires very little, if any, maintenance, and operates properly regardless of the condition of the vehicle springs, or of any changes in one or more of the springs.

What we claim as our invention is:

1. Apparatus for indicating the weight of the load carried by a vehicle on an axle thereof, said vehicle including a load-supporting frame element supported by a spring element through which the load is applied to said axle, comprising supporting means carried by a portion of the spring element near an end of said spring element and supporting the vehicle frame element, said supporting means permitting the frame element to move towards and away from said portion of the spring element as the load on the frame element is increased and decreased and independently of the influence of the load on the spring element, an operator extending between the frame element and said spring element portion near the supporting means and operated by relative movement between said frame element and said element portion, and an indicator actuated by the operator when the frame element moves towards and away from said portion of the spring element under load changes on the frame element, said indicator being calibrated to indicate zero under no load and the weight of any load on the frame element by the amount of movement of the latter element relative the spring element portion.

2. Apparatus for indicating the weight of the load carried by a vehicle on an axle thereof, said vehicle including a load-supporting frame element supported by a spring element through which the load is applied to said axle, comprising resilient supporting means carried by a portion of the spring element near an end of said spring element and supporting the vehicle frame element, said supporting means permitting the frame element to move towards and away from said portion of the spring element as the load on the frame element is increased and decreased and independently of the influence of the load on the spring element, an extensible operator extending between the frame element and said spring element portion near the supporting means and operated by relative movement between said frame element and said element portion, and an indicator actuated by the operator when the frame element moves towards and away from said portion of the spring element under load changes on the frame element, said indicator being calibrated to indicate zero under no load and the weight of any load on the frame by the amount of movement of the latter element relative the spring element portion.

3. Apparatus for indicating the weight of the load carried by a vehicle on an axle thereof, said vehicle including a load-supporting frame element supported by a spring element through which the load is applied to said axle, comprising resilient supporting means carried by a portion of the spring element near an end of said spring element and supporting the vehicle frame element, said supporting means permitting the frame element to move towards and away from said portion of the spring element as the load on the frame element is increased and decreased and independently of the influence of the load on the spring element, an extensible operator mounted on one of said elements and engaging the other element beside the supporting means and operated by relative movement between said frame element and said element portion, and an indicator actuated by the operator on extensional movement of said operator when the frame element moves towards and away from said portion of the spring element under load changes on the frame element, said indicator being calibrated to indicate zero under no load and the weight of any load on the frame element by the amount of movement of the latter relative the spring element portion.

4. Apparatus for indicating the weight of the load carried by a vehicle on an axle thereof, said vehicle including a load-supporting frame element supported by a spring element through which the load is applied to said axle, comprising resilient supporting means carried by a portion of the spring element near an end of said spring element and supporting the vehicle frame element, said supporting means permitting the frame element to move towards and away from said portion of the spring element as the load on the frame element is increased and decreased and independently of the influence of the load on the spring element, an operator cylinder mounted on one of said elements beside the supporting means, a plunger extending from the cylinder and engaging the other element and movable inwardly and outwardly relative to the cylinder by relative movement between said frame element and spring element portion, and an indicator actuated by movement of the plunger into and out of its cylinder when the frame element moves towards and away from said portion of the spring element under load changes on the frame element, said indicator being calibrated to indicate zero under no load and the weight of any load on the frame element by the amount of movement of the latter element relative the spring element portion.

5. Apparatus for indicating the weight of the load carried by a vehicle on an axle thereof, said vehicle including a load-supporting frame element supported by a spring element through which the load is applied to said axle, comprising a rubber supporting block carried by the spring element and supporting the vehicle frame element, said block permitting the frame element to move towards and away from the spring element as the load on the frame element is increased and decreased, an operator extending between the frame and spring elements beside the supporting block and operated by relative movement between said frame and spring elements, and an indicator actuated by the operator when the frame element moves towards and away from the spring element under load changes on the frame element, said indicator being calibrated to indicate zero under no load and the weight of any load on the frame element by the amount of movement of the latter element relative the spring element.

6. Apparatus for indicating the weight of the load carried by a vehicle on an axle thereof, said vehicle including a load-supporting frame element supported by a spring element through which the load is applied to said axle, comprising a rubber supporting block carried by the spring element and supporting the vehicle frame element, said block permitting the frame element to move towards and away from the spring element as the load on the frame element is increased and decreased, an extensible operator near the supporting block and including relatively movably parts one mounted on the frame element and the other part engaging the spring element, and an indicator actuated by the operator when the frame element moves towards and away from the spring element under load changes on the frame element, said indicator being calibrated to indicate zero under no load and the weight of any load on the frame element by the amount of movement of the latter element relative the spring element.

References Cited by the Examiner
UNITED STATES PATENTS

| | | | |
|---|---|---|---|
| 1,147,127 | 7/15 | Troll | 177—137 X |
| 1,864,876 | 6/32 | Westrum | 177—137 |
| 2,867,433 | 1/59 | Bergenheim et al. | 177—139 |

LEO SMILOW, *Primary Examiner.*